United States Patent [19]

Takahashi

[11] Patent Number: 5,124,923
[45] Date of Patent: Jun. 23, 1992

[54] RETARDING APPARATUS FOR AUTOMOTIVE VEHICLES

[75] Inventor: Shigeo Takahashi, Aichi, Japan

[73] Assignee: Aisin Seiki Kabushiki Kaisha, Kariya, Japan

[21] Appl. No.: 607,266

[22] Filed: Oct. 31, 1990

[30] Foreign Application Priority Data

Nov. 8, 1989 [JP] Japan .................. 1-288646

[51] Int. Cl.$^5$ .................................. B60T 7/12
[52] U.S. Cl. .................. 364/426.04; 364/424.01; 364/461; 340/436; 340/903; 180/169
[58] Field of Search .................. 180/167, 169, 170; 340/903, 904, 436, 435; 364/424.01, 426.01, 426.04, 461

[56] References Cited

U.S. PATENT DOCUMENTS

| | | | |
|---|---|---|---|
| 4,273,208 | 6/1981 | Liermann | 180/167 X |
| 4,462,277 | 7/1984 | Miki et al. | 74/867 |
| 4,476,746 | 10/1984 | Miki et al. | 74/867 |
| 4,546,840 | 10/1985 | Yukishige et al. | 180/169 |
| 4,621,705 | 11/1986 | Etoh | 364/461 X |
| 4,628,317 | 12/1986 | Niskikawa et al. | 340/903 |
| 4,703,429 | 10/1987 | Sakata | 364/426.04 |
| 4,706,195 | 11/1987 | Yoshino et al. | 364/426.04 |
| 4,722,410 | 2/1988 | Melocik | 180/169 |
| 4,753,134 | 6/1988 | Hayasaki | 74/866 |
| 4,833,469 | 5/1989 | David | 340/903 X |
| 4,864,298 | 9/1989 | Dombrowski | 340/904 |
| 5,014,200 | 5/1991 | Chundrlik et al. | 364/426.04 |
| 5,053,979 | 10/1991 | Etoh | 364/461 X |

FOREIGN PATENT DOCUMENTS

| | | |
|---|---|---|
| 62-61843 | 3/1987 | Japan . |
| 63-291751 | 11/1988 | Japan . |
| 1-87951 | 4/1989 | Japan . |
| 1-87952 | 4/1989 | Japan . |
| 1-87953 | 4/1989 | Japan . |
| 1-87963 | 4/1989 | Japan . |

Primary Examiner—Parshotam S. Lall
Assistant Examiner—Thomas S. Auchterlonie
Attorney, Agent, or Firm—Burns, Doane, Swecker & Mathis

[57] ABSTRACT

A retarding control apparatus for an automotive vehicle includes first retarding signal output circuit for calculating a speed of a decrease in engine output based upon an engine output detecting signal, and outputting a corresponding retarding signal to a retarder; and first cutting circuit for cutting a connection between first retarding signal output circuit and retarder when a rate of decrease in distance to an object ahead of the vehicle calculated based upon a distance detection signal is less than a predetermined value and the distance to the object is greater than a predetermined value.

14 Claims, 7 Drawing Sheets

RETARDING APPARATUS FOR AUTOMOTIVE VEHICLES

BACKGROUND OF THE INVENTION

1. Field of Industrial Utility

This invention relates to the retarding control apparatus in which use is made of a retarder mounted on an engine or in a power transmission system to absorb a reverse driving force from an automotive vehicle and apply a braking force to the vehicle.

2. Prior Art

Figure 7:
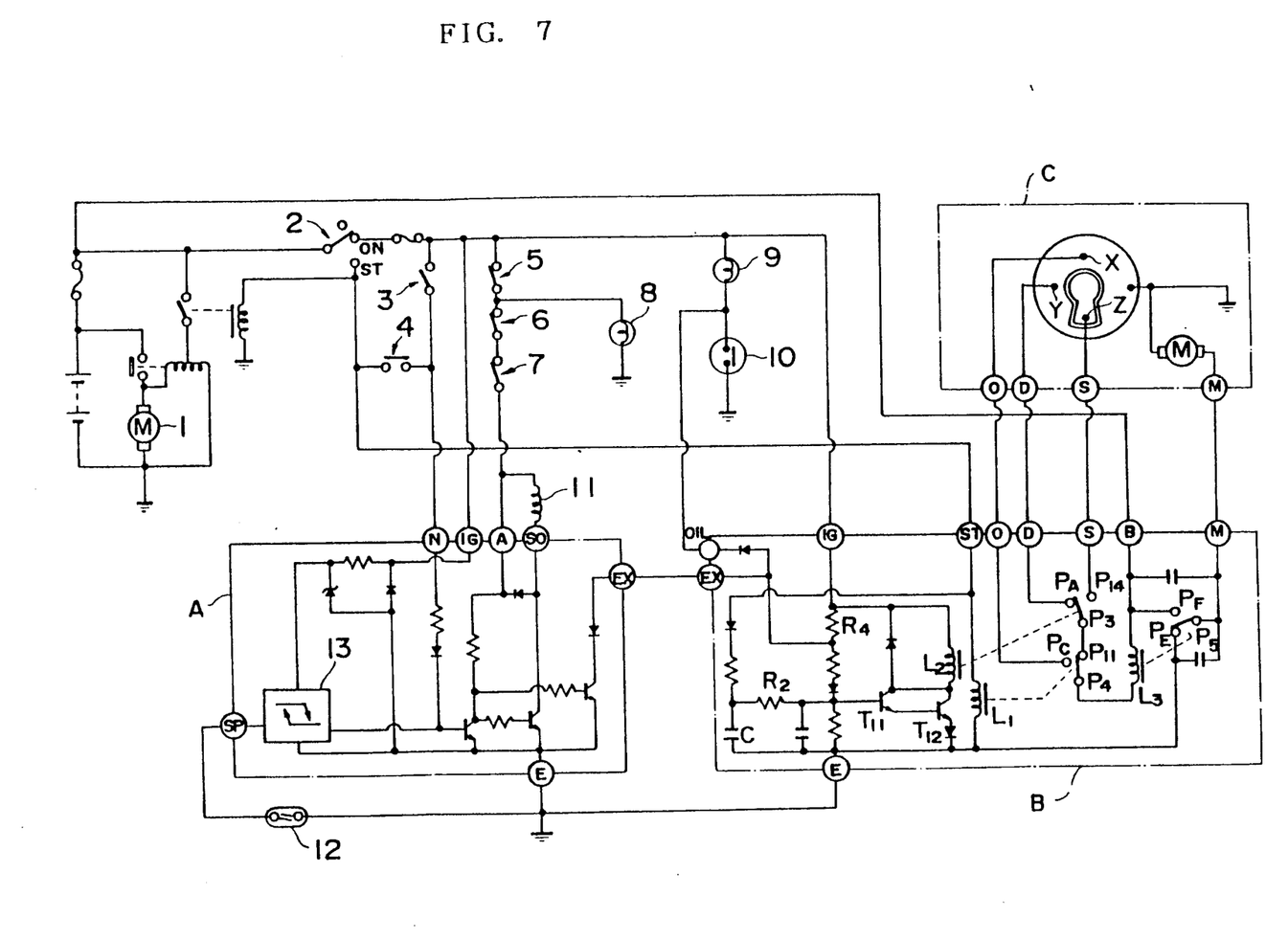
FIG. 7 is a circuit diagram showing an example of the prior art.

FIG. 7 illustrates the retarder control circuit of a retarding control apparatus using an exhaust brake in accordance with the prior art. The control circuit is described in the Toyota Toyace manual (1985-8) and Toyota Dyna Manual (1980-9).

3. Analysis of the Prior Art

The circuit shown in FIG. 7 includes an exhaust brake computer A, a fuel control relay B, a fuel control motor C, a starter motor 1, an ignition switch 2, a neutral switch 3, an auxiliary starter switch 4, a main switch 5, an accelerator switch 6, a clutch switch 7, an exhaust brake indicator lamp 8, an oil lamp 9, an oil pressure switch 10, an exhaust brake solenoid 11 and a speed sensor 12. The exhaust brake computer A includes a low-speed cancelling circuit 13. In the fuel control motor C, X represents a fuel increasing position, Y a drive position and Z a stop position.

Retarder control is performed by controlling the opening and closing of an exhaust brake valve, not shown. The retarder operating conditions are as follows. Specifically, when all of the following conditions are satisfied, the exhaust brake valve is closed and a braking force acts upon the vehicle owing to the pumping action of the engine:

(1) the driver's foot is removed from the accelerator pedal;
(2) the driver's foot is removed from the clutch pedal;
(3) the vehicle velocity is 15 km/h or more;
(4) the neutral switch 3 is turned off; and
(5) the main switch 5 is turned on.

The retarding action cancellation condition is either of the following:

(6) when the vehicle velocity falls to 10 km/h or below;
(7) when any one of the operating conditions (1), (2), (4) and (5) is not satisfied.

SUMMARY OF THE DISCLOSURE

Problems to be Solved by the Invention

However, since the conventional vehicle retarding apparatus of the kind described above operates automatically when the retarder operating conditions (1) through (5) are satisfied, the exhaust brake is actuated when the driver does not anticipate it and therefore the braking action does not fully reflect the intent of the driver. Such an apparatus cannot be said to be fully satisfactory. In order to prevent this unexpected operation of the exhaust brake, the driver must operate a manual changeover switch or the like. This necessitates a troublesome operation in terms of driving.

In a case where the vehicle is brought to a stop or it is attempted to descend a downgrade while using the exhaust brake at a high transmission speed, the engine rotational speed declines too much in the low-vehicle velocity region owing to limitations upon the vehicle velocity conditions. Consequently, it is required for the driver to release the clutch. If this operation should happen to be performed too late, the engine may stall, which is undesirable in terms of safety. In addition, the operation itself is troublesome.

Further, use in the low-velocity region at a low transmission speed is not made possible merely by engaging and releasing the exhaust brake in response to a signal indicative of vehicle velocity, and range in which the exhaust brake is usable is narrow. In accordance with original engine performance, minimum rotational speed at which engine stalling will not occur at actuation of the exhaust brake is substantially decided for the particular engine, and the usable range is decided for the each speed of the transmission. It is possible to use the exhaust brake at lower vehicle velocities the lower he transmission speed used. However, in the prior-art arrangement described above, only one vehicle velocity conditions is set for all transmission speeds. Therefore, vehicle velocity conditions at which engine stalling will not occur must be set for the medium- and high-speeds, and the vehicle velocity conditions naturally must be set high.

OBJECT OF THE INVENTION

It is a general purpose of the present invention to eliminate the aforementioned drawbacks possessed by the conventional vehicle retarding apparatus described above. Specifically, an object of the present invention is to provide a retarding apparatus for the automotive vehicle in which control of the regarding apparatus can be performed appropriately in conformity with the intent of the driver and the traveling state of the vehicle, there is no risk of engine stalling at any transmission speed, the driver is freed from troublesome operation of a switch or the like, and driving safety is enhanced.

According to the present invention, the foregoing object is attained by providing a retarding control apparatus comprising: first retarding signal output means for calculating the speed of a decrease in engine output (e.g., throttle return speed) based upon an engine output detection signal (e.g., throttle opening signal), and outputting a retarding signal, which corresponds to the speed of decrease in engine output, to a retarder mounted in a drive system of the vehicle, distance detecting means for detecting distance to an object ahead of the vehicle in the travelling direction thereof, and first cutting means for calculating a rate of decrease in distance to the object based upon a detection signal from the distance detecting means and cutting a connection between the first retarding signal output means and the retarder when the rate of decrease in distance is less than a predetermined value and the distance to the object is greater than a predetermined value.

The invention further provides a retarding apparatus for an automotive vehicle constituted by this retarding control apparatus and the retarder mounted in the drive system of the vehicle.

A more accurate and reliable arrangement is obtained by virtue of the following preferred embodiments of the vehicle retarding control apparatus having the foregoing construction:

(1) A retarding control apparatus for an automotive vehicle, in which the first cutting means cuts a connection between the first retarding signal output means and the retarder when engine output (e.g., throttle opening) detected by the engine output detecting means is equal to or greater than a predetermined value.

(2) A retarding control apparatus for an automotive vehicle further comprising brake actuation detecting means, second retarding signal output means for outputting, to the retarder, a retarding signal corresponding to brake actuation based upon a detection signal from the brake actuation detecting means, and changeover means for changing over the connection to the retarder from the first retarding signal output means to the second retarding signal output means when the brake actuation detecting means detects actuation of the brake.

(3) A retarding control apparatus for an automotive vehicle further comprising vehicle velocity detecting means, and second cutting means for calculating acceleration based upon a detection signal from the vehicle velocity detecting means, and cutting a connection between the first retarding signal output means and the retarder when the calculated acceleration and the distance to the object detected by the distance detecting means are equal to or greater than respective predetermined values.

(4) A retarding control apparatus for an automotive vehicle, in which the second cutting means cuts connections between both the first and second retarding signal output means and the retarder.

GENERAL FUNCTION

In the vehicle retarding control apparatus according to the present invention as described above, the first retarding signal output means outputs a retarding signal to the retarder based upon an engine output (e.g., throttle opening) detection signal from the engine output detecting means. When the distance to an object ahead of the vehicle in the traveling direction thereof is less than a predetermined value (i.e., when the vehicle has come too close to the object) based upon the distance detection signal from the distance detecting means and, moreover, the rate of decrease in distance is equal to or greater than a predetermined value (i.e., when the approach velocity is too large), retarder control in accordance with the retarding signal from the first retarding signal output means is allowed. At all other times the first cutting means cuts off the output of the retarding signal to the retarder.

When the engine output (e.g., throttle opening) is less than a predetermined value (i.e., when the vehicle is not accelerating), the first cutting means allows control of the retarder in accordance with the retarding signal from the first retarding signal output means. At all other times the first cutting means cuts off the output of the retarding signal to the retarder.

If the brake actuation detecting means is provided, then, in response to a detection signal from this detecting means, the retarding signal from the first retarding signal output means is cut off and the second retarding signal output means outputs a retarding signal, which deals with actuation of the brake, to the retarder. The retarding signal for dealing with the brake from the second retarding signal output means is on/off controlled by the first cutting means in an analogous manner as the signal from the first retarding signal output means.

If the vehicle velocity detecting means is provided, then, when the acceleration calculated based upon the detection signal from the vehicle velocity detecting means and the distance to the object detected by the distance detecting means are less than respective predetermined values, connection to the retarder of the retarding signal from the first retarding signal output means is allowed. At all other times the second cutting means cuts off the output of the retarding signal to the retarder. The second cutting means is also capable of cutting the connection between the second retarding signal output means and the retarder and the same time that the connection between the first retarding signal output means and the retarder is broken.

MERITORIOUS EFFECTS OF THE INVENTION

According to the present invention as set forth above, the retarding apparatus can be controlled in accordance with the throttle opening and brake actuation state, there is no risk of stalling at any transmission speed, and retarding control is turned on and off automatically in dependence upon the distance to an object ahead of the vehicle in the traveling direction thereof, the closing velocity to the object, the vehicle velocity and the throttle opening prevailing at such time. This frees the driver from performing a troublesome switching operation and makes safe driving possible.

DESCRIPTION OF THE PREFERRED EMBODIMENTS

The present invention will now be described in detail based on embodiments shown in the drawings.

Figure 1:
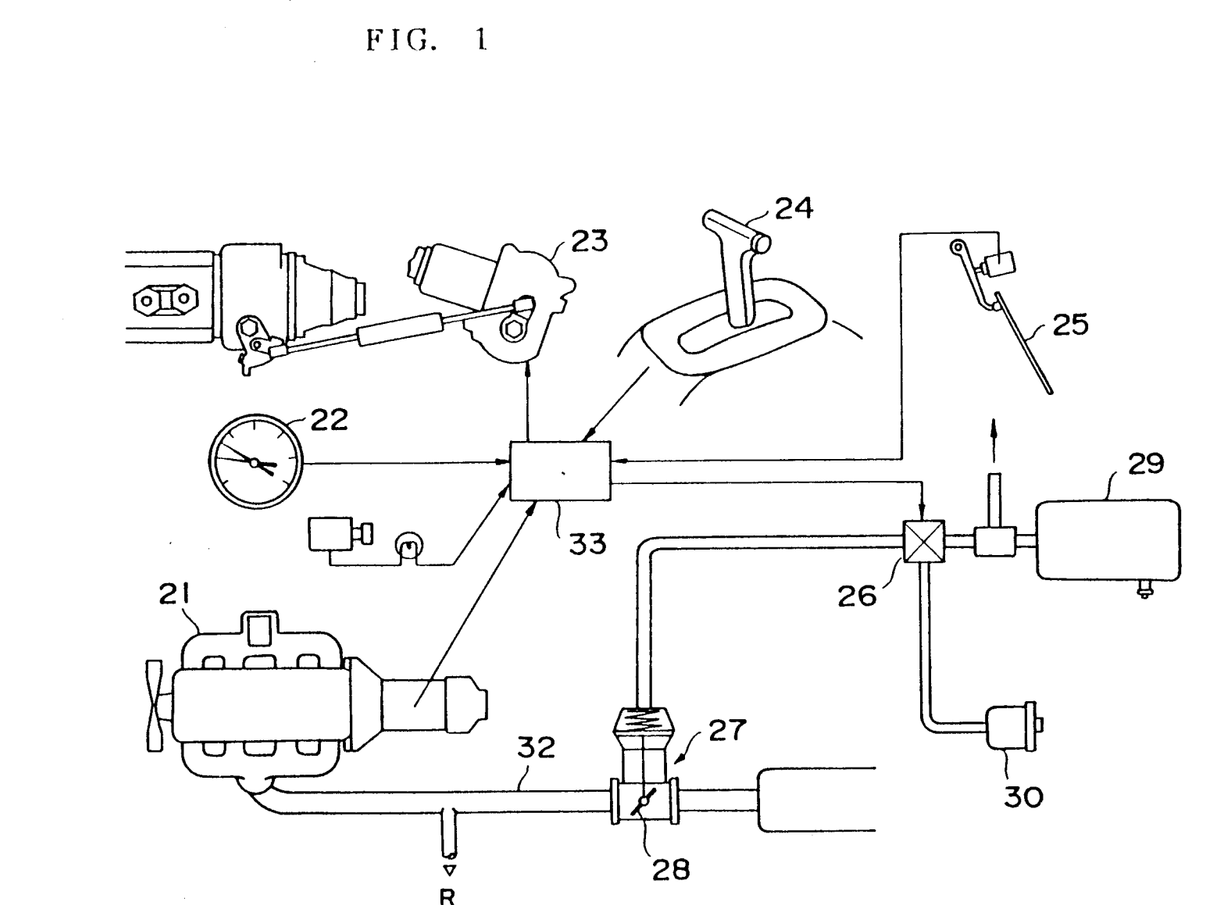
FIG. 1 is a diagram illustrating the control system of an engine exhaust brake according to an embodiment of the present invention.

FIG. 1 illustrates the control system of an engine exhaust brake to which the present invention is applied. The system includes an engine 21, a tachometer 22, a fuel injection device 23, a shift lever 24, a throttle pedal 25, an exhaust brake solenoid 26, an exhaust brake 27, an exhaust brake valve 28, a vacuum tank 29, an air cleaner 30, and an exhaust muffler 31. The exhaust brake 27 is arranged in an exhaust pipe 32 connecting the exhaust muffler 31 and the engine 21. The operating state of each of these devices is coverted into an electric signal which is then fed into a microcomputer 33.

Figure 2:
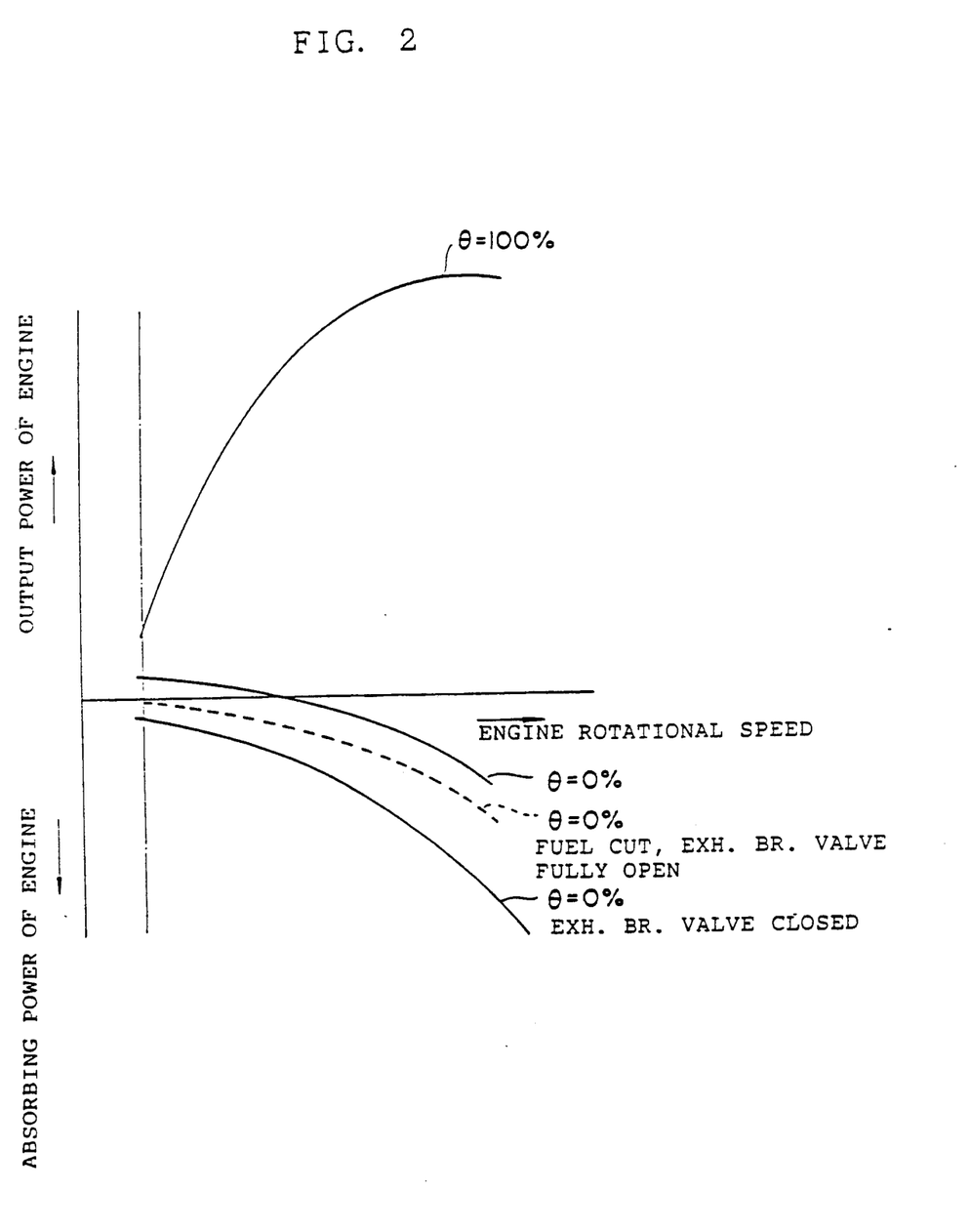
FIG. 2 is power characteristic diagram showing the relationship between actuation of an exhaust brake valve and the absorbing power of an engine.
Figure 3:
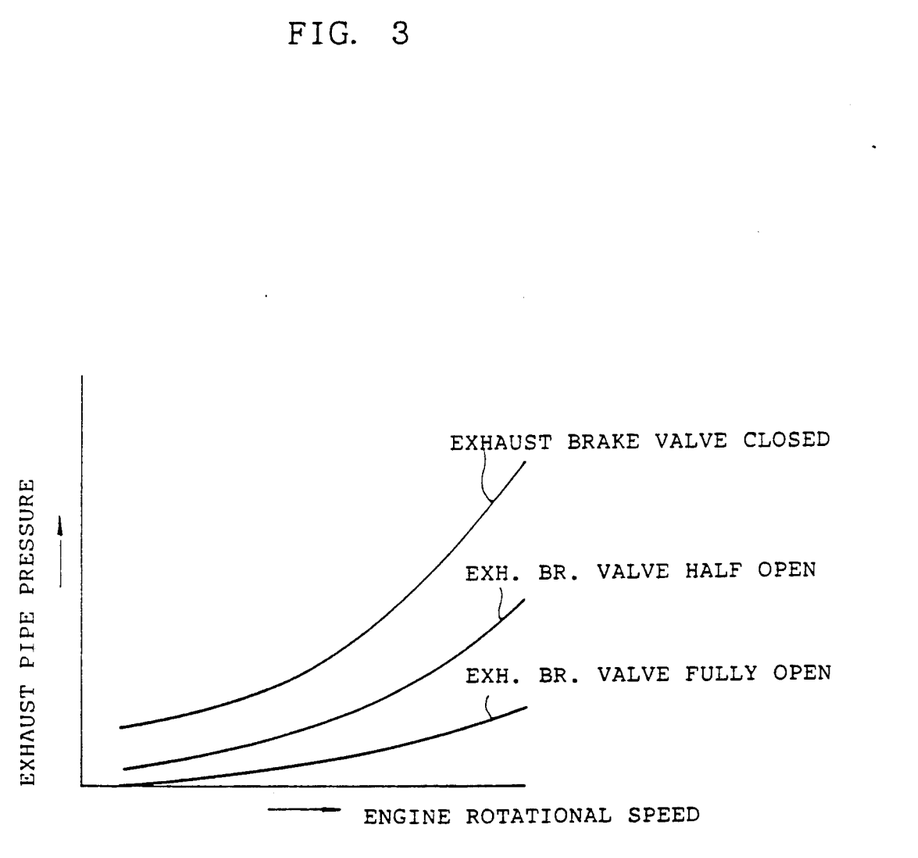
FIG. 3 is a characteristic diagram showing actuation of the exhaust brake valve and characteristics of exhaust pipe pressure.

FIG. 2 is power characteristic diagram showing the relationship between actuation of the exhaust brake valve 28 and the absorbing power of an engine 21. As will be understood by comparing this diagram with the characteristic diagram of FIG. 3, which shows actuation of the exhaust brake valve 28 and the characteristics of exhaust pipe pressure, the two diagrams approximately correspond. It will be understood that the braking action performed by the exhaust brake valve 28 can be adjusted by suitably regulating the exhaust brake valve 28.

Figure 4:
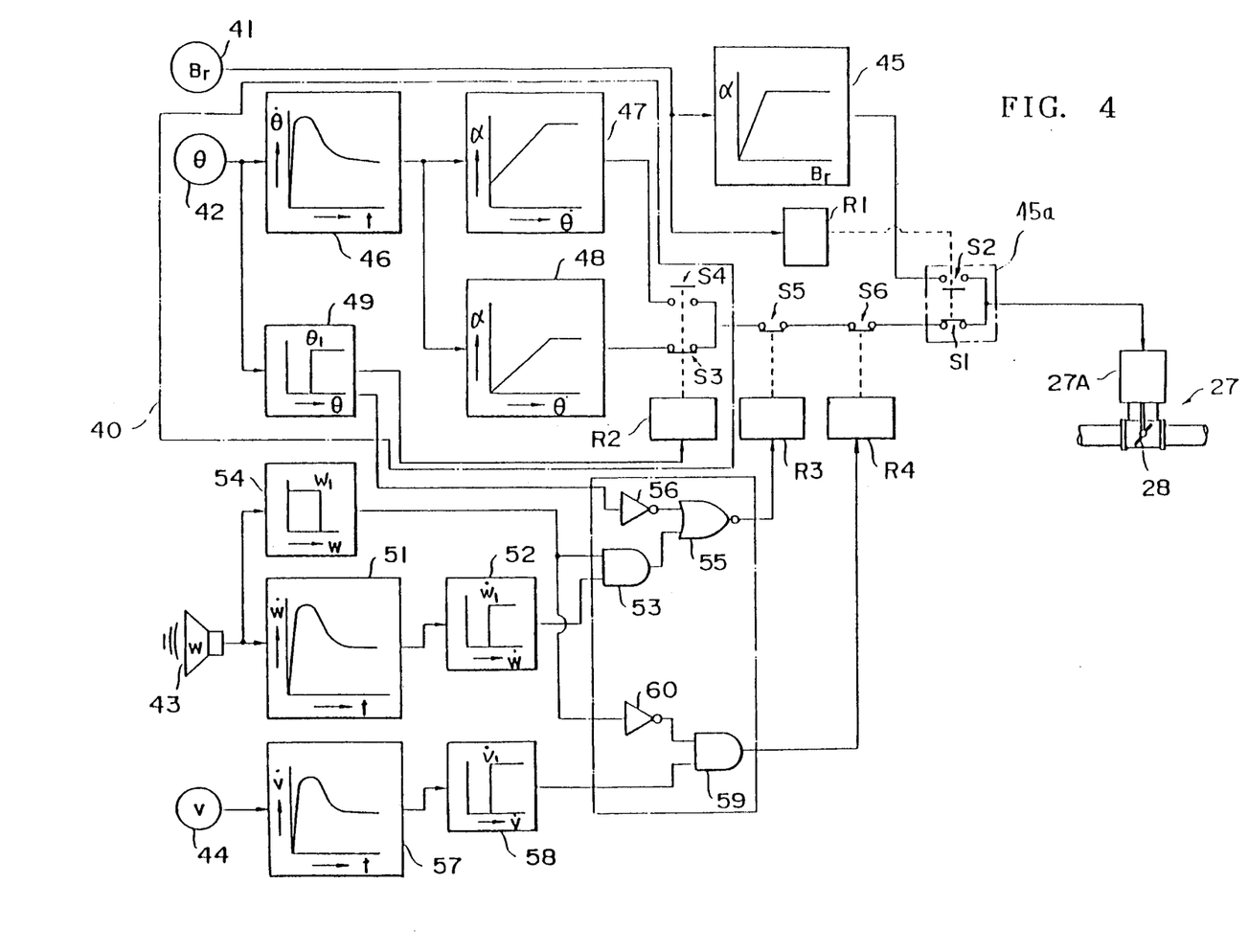
FIG. 4 is a block diagram of a retarding control circuit illustrating an embodiment of the present invention.

FIG. 4 is a block diagram showing a retarding control circuit of a retarding control apparatus which controls the on/off action of the exhaust brake 27. The circuit controls the on/off action of the exhaust brake based upon detection values from a brake detecting sensor (brake actuation detecting means) 41, a throttle opening sensor (engine output detecting means) 42, a distance sensor (distance detecting means) 43 and a vehicle velocity sensor 8 (vehicle velocity detecting means) 44.

More specifically, a brake signal (e.g., a signal indicative of brake pressure) Br from the brake detecting sensor 41 enters an arithmetic unit 45 serving as second retarding signal output means. The arithmetic unit 45 converts the brake signal to produce a signal $\alpha$ indicative of the opening of the exhaust brake valve 28. This signal corresponds to the brake signal Br. At the same time, a relay R1 is changed over by the brake signal Br to open a switch S1 and close a switch S2, thereby delivering the signal $\alpha$ to an actuator 27A of the exhaust brake (retarder) 27. The switches S1 and S2 changed over by the relay R1 constitute changeover means 45a.

A throttle opening signal $\theta$ from the throttle opening sensor 42 enters an arithmetic unit 46 for calculating throttle pedal speed. The arithmetic unit 46 produces a signal $\dot{\theta}$ which corresponds to the return speed of the throttle pedal 25. (By way of example, the signal $\dot{\theta}$ may represent the peak value of this speed.) This signal is outputted to a first $\alpha$ arithmetic unit 48 and a second $\alpha$ arithmetic unit 47. These two $\alpha$ arithmetic units 47, 48 have different rates of conversion for converting the return-speed signal $\dot{\theta}$ into the valve-opening indicating signal $\alpha$. In this embodiment, the conversion rate of the second $\alpha$ arithmetic unit 47 is larger than that of the first $\alpha$ arithmetic unit 48. The throttle opening signal $\theta$ enters a throttle opening comparator 49 as well. When the throttle opening signal $\theta$ is equal to or greater than a predetermined value $\theta_1$, the comparator 49 outputs a switch changeover signal to a relay R2, in response to which the relay R2 is changed over to open a switch S3 and close a switch S4. When the throttle opening $\theta$ is less than the predetermined value $\theta_1$, the comparator 49 does not produce the switch changeover signal, and therefore the switch S3 is in the closed state and the switch S4 is in the open state, as illustrated. When the switch S1 and switches S5, S6, described later, are all closed, either the valve-opening indicating signal $\alpha$ from the first $\alpha$ arithmetic unit 48 or that from the second $\alpha$ arithmetic unit 47, whichever is selected by the changeover between the switches S3 and S4, enters the actuator 27A.

The state illustrated in FIG. 4 is that which prevails when the throttle opening $\theta$ is less than the predetermined value $\theta_1$ and the brake is not operating (Br=0). In response to the valve-opening indicating signal $\alpha$ from the first $\alpha$ arithmetic unit 48, the actuator 27A moves the exhaust brake valve 28 to the proper opening and causes engine braking to act.

When the throttle opening $\theta$ is equal to or greater than the predetermined value $\theta_1$, switch S4 is closed and switch S3 is opened to change over the circuit. As a result, the exhsaust brake valve 28 is operated in accordance with the characteristic of the second $\alpha$ arithmetic unit 47 (namely in accordance with the larger $\alpha$) in response to the signal from the second $\alpha$ arithmetic unit 47.

When the foot brake of the vehicle is depressed and the brake signal Br is produced, switch S2 is closed and switch S1 is opened, as a result of which the circuit is changed over by changeover means 45a. As a consequence, the exhaust brake valve 28 is operated by the signal from the arithmetic unit 45, thereby causing engine braking to act.

Accordingly, the exhaust brake 27 is suitably controlled in conformity with the return speed $\dot{\theta}$ of the accelerator (throttle opening) or the state of brake actuation (brake pressure) by the retarding signal generating circuit 40, the second retarding signal output means 45 and the changeover means 45a for changing over between the outputs from these two circuits.

The distance sensor 43 and vehicle velocity sensor 44 are provided in order to control operation of the exhaust brake 27 in conformity with the rate of change in the distance to an object ahead of the vehicle in its direction of travel.

More specifically, based upon a distance signal w from the distance sensor 43, an arithmetic unit 51 calculates a rate of decrease $\dot{w}$ in the distance to the object ahead of the vehicle and delivers a signal indicative of w to a comparator 52. If the rate of decrease $\dot{w}$ in distance is equal to or greater than a predetermined value $\dot{w}_1$, the comparator 52 outputs a signal applied to an AND gate 53. The distance signal w from the distance sensor 43 is applied also to a distance comparator 54 which, when the distance to the object is less than a predetermined value $w_1$, outputs a signal to the AND gate 53.

The AND gate 53 to which the signals from the two comparators 52, 54 are applied outputs a signal to a NOR gate 55. The arrangement is such that when the throttle opening $\theta$ is less than the predetermined value $\theta_1$, an inverter circuit 56 to which the signal from the throttle-opening comparator 49 is applied delivers a signal to the NOR gate 55. In the absence of signals from the AND gate 53 and inverter circuit 56, the NOR gate 55 outputs a changeover signal to a relay R3, as a result of which the switch S5 is opened to cut off the retarding signal $\alpha$ from the retarding signal generating circuit 40. In FIG. 4, switch S5 is illustrated as being normally closed (NC).

Accordingly, when the distance w to the object is greater than the predetermined value $w_1$ or the rate of decrease $\dot{w}$ in distance is less than the predetermined value $\dot{w}_1$, or when the throttle opening $\theta$ is equal to or greater than $\theta_1$, the exhaust brake 27 is not operated by the throttle opening $\theta$.

The vehicle velocity signal v from the vehicle velocity sensor 44 enters an acceleration arithmetic unit 57, which provides an acceleration comparator 58 with a signal indicative of acceleration $\dot{v}$ calculated from the vehicle velocity signal $\dot{v}$. When the acceleration signal $\dot{v}$ is equal to or greater than a predetermined value $\dot{v}_1$, the comparator 58 outputs a signal to an AND gate 59. The AND gate arrangement is such that when the distance w to the object is equal to or greater than the predetermined value $w_1$, a signal enters the AND gate 59 via an inverter circuit 60, to which the signal from the comparator 54 is applied. When the signals from both the acceleration comparator 58 and inverter circuit 60 enter the AND gate 59, the latter delivers a changeover signal to a relay R4, thereby opening the switch S6. As a result, the retarding signal $\alpha$ from the retarding signal output means 40 is cut off.

Accordingly, when the acceleration $\dot{v}$ is equal to or greater than the predetermined value $\dot{v}_1$, or if the distance w to the object is equal to or greater than the predetermined value $w_1$, the exhaust brake 27 is not operated by the throttle opening $\theta$.

Figure 5:
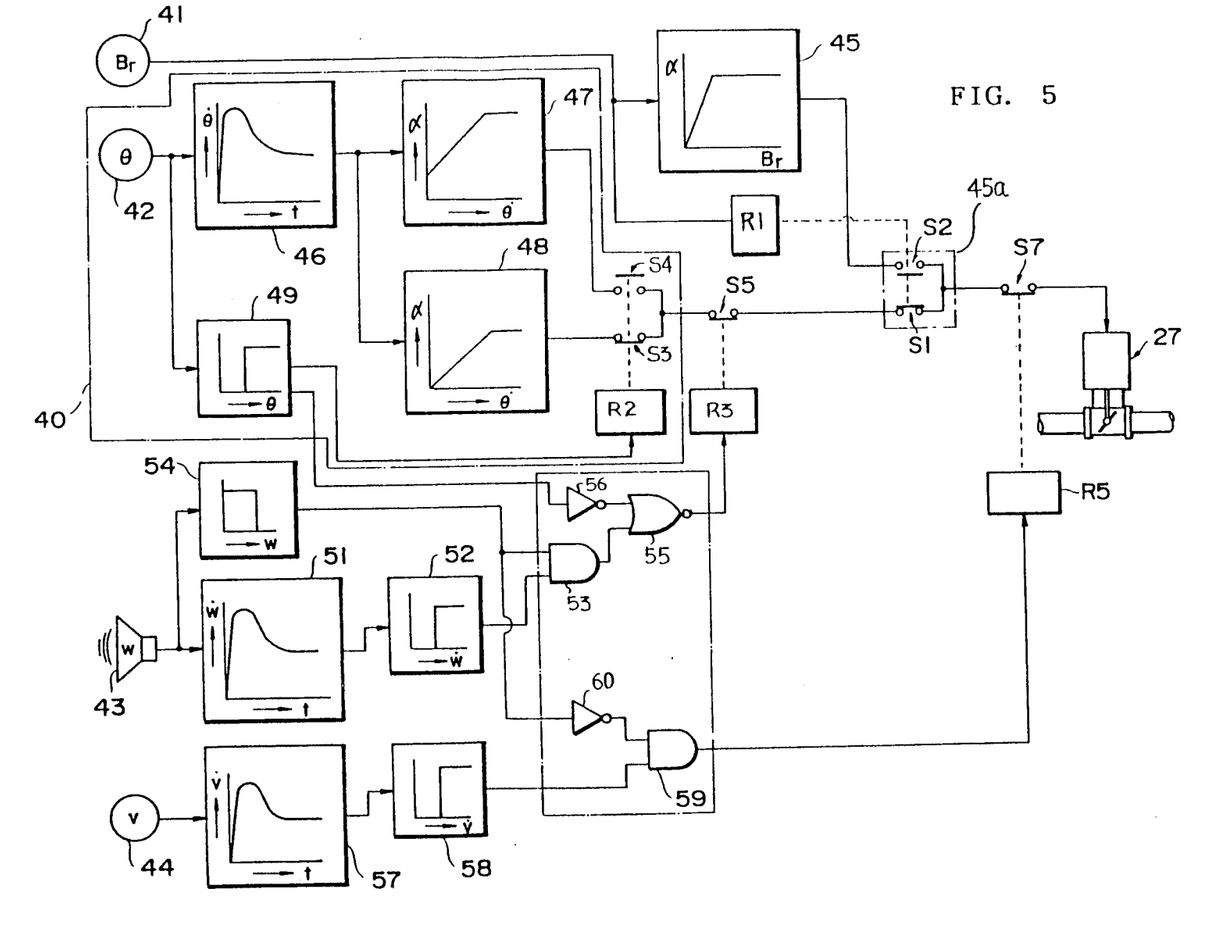
FIG. 5 is a block diagram of a retarding control circuit illustrating another embodiment of the present invention.

FIG. 5 illustrates another embodiment of the present invention. In this embodiment, the switch S6 serving as second cutting means in the embodiment of FIG. 4 is not provided between the switch S1 and the switch S5. Instead, a switch S7 is connected between the switches S1, S2 and the actuator 27A, and the switch S7 is changed over by a relay R5 actuated by the signal from the AND gate 59. In other aspects the structure is the same as that of FIG. 4.

By thus connecting the switch S7 (which constitutes a modification of the second cutting means), both retarding control based upon the throttle opening $\theta$ and that based upon the brake signal Br can be cut off, whereas in the case of FIG. 4, only retarding control based upon the throttle opening $\theta$ can be cut off.

Figure 6:
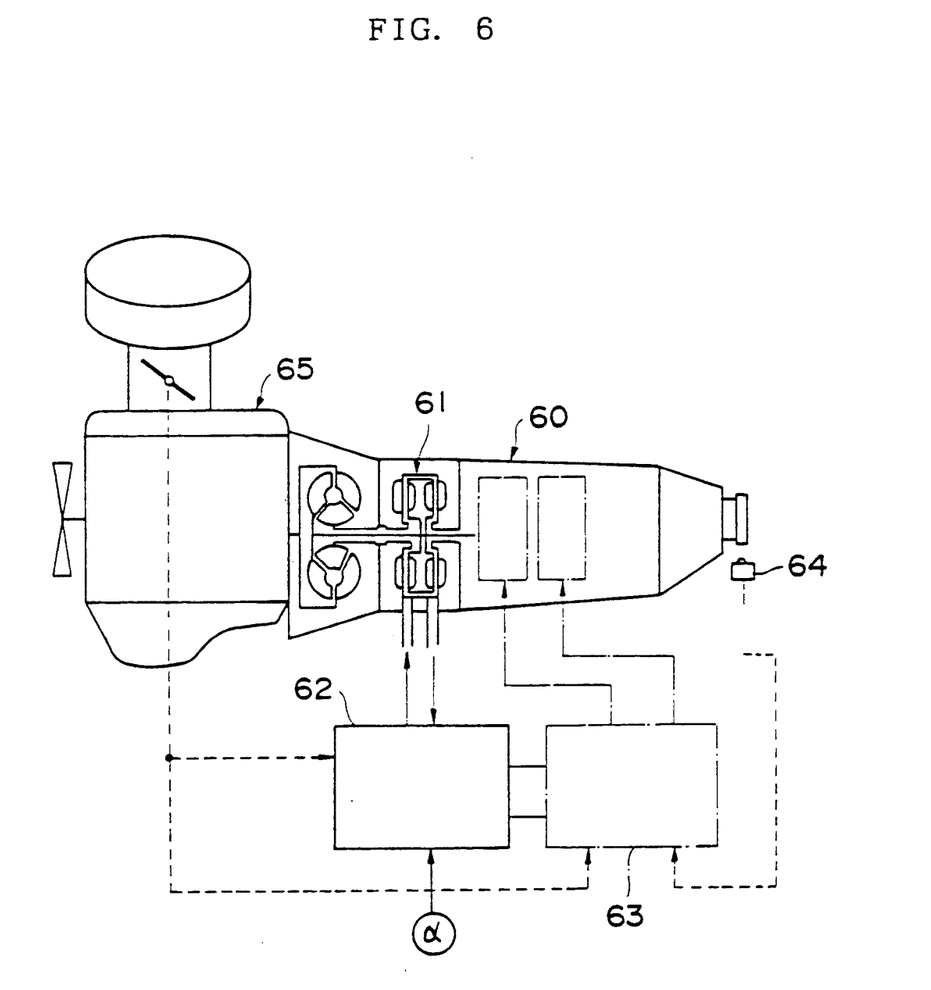
FIG. 6 is a structural view showing another embodiment of the present invention.

Though the retarding apparatus according to the invention has been described for a case where an exhaust brake is employed as the retarder, it is also possible to use a fluidic retarder 61, which is incorporated in an automatic transmission 60 of the kind shown in FIG. 6, as the retarder.

More specifically, in FIG. 6, numeral 61 denotes the fluidic retarder, 62 a retarder control circuit, 63 a shift control circuit, and 64 a vehicle velocity sensor. The retarding signal $\alpha$ from the retarding apparatus of FIG. 4 or 5 enters the retarder control circuit 62. The latter adjusts the supply pressure or supply flow rate of the fluid supplied to the fluidic retarder 61, and the retarder 61 converts the kinetic energy of reverse drive from the vehicle wheels into thermal energy, thereby performing retarding control.

As many apparently widely different embodiments of the present invention can be made without departing from the spirit and scope thereof, it is to be understood that the invention is not limited to the specific embodiments thereof except as defined in the appended claims. Also further objects of the present invention will be understood from the entire disclosure including claims and drawings.

What is claimed is:

1. A retarding control apparatus for an automotive vehicle, comprising:
    first retarding signal output means for calculating a speed of a decrease in engine output based upon a detection signal from engine output detecting means, and outputting a retarding signal, which corresponds to the speed of decrease in engine output, to a retarder mounted in a drive system of the vehicle;
    first cutting means for cutting a connection between said first retarding signal output means and said retarder when a rate of decrease in distance to an object ahead of the vehicle in the traveling direction thereof, which is calculated based upon a detection signal from distance detecting means for detecting said distance, is less than a predetermined value and the distance to the object is greater than a predetermined value; and
    second cutting means for cutting a connection between said first retarding signal output means and said retarder when acceleration, which is calculated based upon a vehicle velocity signal, and the distance to the object detected by said distance detecting means are, not less than respective predetermined values.

2. The apparatus according to claim 1, wherein said first cutting means cuts a connection between said first retarding signal output means and said retarder when engine output detected by said engine output detecting means is not less than a predetermined value.

3. The apparatus according to claim 1, further comprising:
    second retarding signal output means for outputting, to said retarder, a retarding signal corresponding to brake actuation based upon a brake actuation detection signal; and
    changeover means for changing over the connection to the retarder from said first retarding signal output means to said second retarding signal output means when said brake actuation detection signal is delivered.

4. The apparatus according to claim 1, wherein second cutting means is further provided as cutting means for cutting connections between said first and a second retarding signal output means and said retarder.

5. A retarding control apparatus control apparatus for an automotive vehicle comprising:
    a retarder,
    engine output detecting means for detecting the throttle opening,
    distance detecting means for detecting the distance to an object lying ahead in the travelling direction of the vehicle,
    vehicle velocity detecting means for detecting the vehicle velocity,
    first retarding signal output means for outputting an output signal to said retarder responsive to a detection signal from said engine output detecting means, comprising of a first arithmetic unit for calculating the throttle pedal speed, responsive to the detection signal of said engine output detecting means to output an output signal which corresponds to the return speed of a throttle pedal,
    two additional arithmetric units to which the output signal of said first arithmetic unit for calculating the throttle pedal speed is inputted to set retarder output signals with different converting rates, and
    second changeover means for changing over between said two additional arithmetic units responsive to the throttle opening.

6. The apparatus according to claim 5 further comprising second cutting means for cutting off the output of said first retarding signal output means responsive to the detection signals from said distance detection means and said vehicle velocity detection means.

7. The apparatus according to claim 5, further comprising:
    brake actuation detecting means for detecting the brake actuation state of the vehicle,
    second retarding signal output means for outputting a signal responsive to a detection signal of said brake actuation detecting means, and
    first changeover means for changing over the connection to said retarder from the first retarding signal output means to the second retarding signal output means responsive to the detection signal of said brake actuation detecting means.

8. The apparatus according to claim 5 wherein said first cutting means comprises:
    first comparator means for comparing the rate of decrease in distance and the distance detected by said distance detecting means, and the throttle opening detected by said engine output detecting means with a predetermined value, respectively, and a first cut-off circuit means for cutting off an output from the first retarding signal output means when it is found by said comparator means that the rate of decrease in distance is less than a predetermined value, said distance is larger than a predetermined value and said throttle opening is larger than a predetermined value.

9. A retarding control apparatus for an automotive vehicle comprising:

a retarder, engine output detecting means for detecting the throttle opening, distance detecting means for detecting the distance to an object lying ahead in the travelling direction of the vehicle, vehicle velocity detecting means for detecting the vehicle velocity, first retarding signal output means for outputting an output signal to said retarder responsive to a detection signal from said engine output detecting means, first cutting means for cutting off the output signal from said first retarding signal output means responsive to detection signals of said distance detection means and said engine output detection means, second cutting means for cutting off the output of said first retarding signal output means responsive to the detection signals from said distance detection means and said vehicle velocity detection means, second comparator means for comparing the distance detected by said distance detection means and the acceleration detected by vehicle speed detecting means with predetermined value, respectively, and second cut-off circuit means for cutting off an output of said second retarding signal output means when it is found by said second comparator means that said distance is larger than a predetermined value and said acceleration is larger than a predetermined value.

10. A retarding control apparatus for an automotive vehicle comprising:

a retarder, engine output detecting means for detecting the throttle opening, distance detecting means for detecting the distance to an object lying ahead in the travelling direction of the vehicle, vehicle velocity detecting means for detecting the vehicle velocity, first retarding signal output means for outputting an output signal to said retarder responsive to a detection signal from said engine output detecting means, first cutting means for cutting off the output signal from said first retarding signal output means responsive to detection signals of said distance detection means and said engine output detection means, second cutting means for cutting off the output of said first retarding signal output means responsive to the detection signals from said distance detection means and said vehicle velocity detection means, brake actuation detecting means for detecting the brake actuation state of the vehicle, second retarding signal output means for outputting a signal responsive to a detection signal of said brake actuation detecting means, and first changeover means for changing over the connection to said retarder from the first retarding signal output means to the second retarding signal output means responsive to the detection signal of said brake actuation detecting means, wherein said first retarding signal output means comprises: p1 an arithmetic unit for calculating the throttle pedal speed, responsive to the detection signal of said engine output detecting means to output an output signal which corresponds to the return speed of a throttle pedal, two arithmetic units to which the output signal of said arithmetic unit for calculating the throttle pedal speed is inputted and which are adapted for setting retarder output signals with different converting rates, and second changeover means for changing over between said two arithmetic unit responsive to the throttle opening.

11. A retarding control apparatus for an automotive vehicle comprising:

a retarder, engine output detecting means for detecting the throttle opening, distance detecting means for detecting the distance to an object lying ahead in the travelling direction of the vehicle, vehicle velocity detection means for detecting the vehicle velocity, brake actuation detecting means for detecting the brake actuation state of the vehicle, first retarding signal output means for outputting an output signal to said retarder responsive to a detection signal from said engine output detecting means, second retarding signal output means for outputting an output signal to said retarder responsive to a detection signal of said brake actuation detecting means, first changeover means for changing over the connection to the retarder from the first retarding signal output means to the second retarding signal output means responsive to a detection signal of said brake actuation detection means, and second cutting means for cutting off outputs of the first and second retarding signal output means responsive to the detection signals of said distance detection means and said vehicle speed detecting means.

12. The apparatus according to claim 11, wherein said first retarding signal output means comprises:

an arithmetic unit for calculating the throttle pedal speed, responsive to the detection signal of said engine output detecting means to output an output signal which corresponds to the return speed of a throttle pedal, two arithmetic units to which the output signal of said arithmetic unit for calculating the throttle pedal speed is inputted and which are adapted for setting retarder output signals with different converting rates, and second changeover means for changing over between said two arithmetic units responsive to the throttle opening.

13. The apparatus according to claim 11 wherein said first cutting means comprises:

first comparator means for comparing the rate of decrease in distance and the distance detected by said distance detecting means, and the throttle opening detected by said engine output detecting means with a predetermined value, respectively, and a first cut-off circuit means for cutting off an output from the first retarding signal output means when it is found by said comparator means that the rate of decrease in distance is less than a predetermined value, said distance is larger than a predetemined value and said throttle opening is larger than a predetermined value.

14. The apparatus according to claim 11, wherein said second cutting means comprises:

second comparator means for comparing the distance detected by said distance detection means and the acceleration detected by vehicle speed detecting means with a predetermined value, respectively, and second cut-off circuit means for cutting off an output of said second retarding signal output means when it is found by said second comparator means that said distance is larger than a predetermined value and said acceleration is larger than a predetermined value.

* * * * *